United States Patent [19]

Blumling

[11] 4,369,444
[45] Jan. 18, 1983

[54] MULTIPATH DOPPLER SHIFT VERTICAL SPEED MEASUREMENT SYSTEM

[75] Inventor: James P. Blumling, Levittown, N.Y.

[73] Assignee: Grumman Aerospace Corporation, Bethpage, N.Y.

[21] Appl. No.: 205,180

[22] Filed: Nov. 10, 1980

[51] Int. Cl.³ .................................... G01S 13/58
[52] U.S. Cl. ........................... 343/8; 343/112 S
[58] Field of Search .................... 343/8, 112 S

[56] References Cited

U.S. PATENT DOCUMENTS

| | | |
|---|---|---|
| 2,134,535 | 10/1938 | Runge . |
| 2,413,620 | 12/1946 | Guanella . |
| 2,837,738 | 6/1958 | Van Valkenburgh . |
| 2,907,028 | 9/1959 | Stirton et al. . |
| 2,972,142 | 2/1961 | Parkinson et al. . |
| 3,001,191 | 9/1961 | Richter . |
| 3,137,850 | 6/1964 | Alpers . |
| 3,210,762 | 10/1965 | Brabant . |
| 3,229,283 | 1/1966 | Hefter et al. . |
| 3,242,490 | 3/1966 | Wentworth et al. . |
| 3,320,615 | 5/1967 | Albright et al. . |
| 3,721,986 | 3/1973 | Kramer . |
| 3,812,493 | 5/1974 | Afendykiw et al. . |

*Primary Examiner*—T. H. Tubbesing
*Attorney, Agent, or Firm*—Morgan, Finnegan, Pine, Foley & Lee

[57] ABSTRACT

A radar system for measuring the vertical component of velocity of a target uses the differences in Doppler frequency between the direct and multipath radar returns. The system filters from this difference a component caused by the targets relative radial speed and then determines the vertical speed from the remaining component.

12 Claims, 4 Drawing Figures

MULTIPATH DOPPLER SHIFT VERTICAL SPEED MEASUREMENT SYSTEM

BACKGROUND OF THE INVENTION

1. Field of the Invention

The present invention relates to a radar system, and more particularly, to an airborne radar system and method for measuring the vertical component of velocity of an airborne target. The present invention involves receiving reflected signal returns from both a moving target and the earth, and using appropriate processing electronics for determining the required parameter measurements.

2. The Prior Art

Typical known systems for measuring target parameters are illustrated in U.S. Pat. Nos. 3,137,850; 3,229,283; 2,837,738; 3,210,762; 3,242,490; 3,812,493 and 2,907,028. While the referenced systems provide means for determining target velocity, they generally require undesirably large changes in target altitude so that an average velocity may be calculated by dividing the pertinent distance traversed by the target by the time elapsed.

It is an object of the present invention to provide a system whereby the vertical speed of the target may be measured on a single dwell such that it is not necessary to wait for a measurable change in target altitude for a vertical speed measurement to be performed.

Other objects will become apparent from the detailed description of the subject invention which follows.

SUMMARY OF THE INVENTION

Generally, the present invention provides a radar system for measuring the vertical component of velocity of a moving target, and in particular, an airborne Doppler radar system for effecting such measurement. Typically, the subject system includes a transmitter with an associated antenna for radiating toward the target electromagnetic energy of known wavelength $\lambda$, a receiver-processor for receiving and processing the electromagnetic energy reflected from the target, and a navigation subsystem for measuring the parameters of the radar, e.g., ground speed, and altitude. As is known, the system may include a single antenna which is selectively connected to the transmitter and the receiver processor, or a pair of antennae one of which being connected to the transmitter, the other to the receiver processor.

The receiver-processor includes a detector which is adapted to be responsive to two components of the electro-magnetic energy reflected from the target. The first component is reflected energy of frequency $f_o$, with associated Doppler frequency $f'_{do}$ which is received from the target via a direct line of sight or path between the antenna and the target. The second component is reflected energy of frequency $f_l$, with associated Doppler frequency $f'_{dl}$, which is received via an indirect path and which includes a reflection from the surface of the earth. The receiver-processor also includes means responsive to the detector for generating a direct Doppler signal $E_1$ representing $f'_{do}$; an indirect Doppler signal $E_2$ representing $f'_{dl}$; a slant range signal $E_4$ representing target slant range $R_o$; a radial velocity signal $E_{VR}$ representing the relative radial velocity $V_{rad}$ between the target and the radar; and a transmitter signal $E_5$ representing the transmitted wavelength $\lambda$. The receiver-processor further includes means responsive to the outputs of the navigation sub-system for providing an output signal $E_{HT}$ representative of the target height $H_T$ and a radar height signal $E_3$ representing the height $H_R$ of the radar. Means responsible to the signals $E_{VR}$, $E_3$, $E_4$, $E_5$ and $E_{HT}$ from the receiver-processor provides a signal $E_{D1}$ representing a Doppler difference $\delta f_d$ where $\delta f_d$ is approximately defined by the relationship:

$$\delta f_d = \frac{V_{rad}}{\lambda}(1 - R_o/(R_o^2 + 4h_R h_T)^{\frac{1}{2}})$$

Means responsive to signals $E_1$ and $E_2$ provide a signal $E_{D2}$ which represents the difference $\delta f'_d$ between the direct and indirect Doppler frequencies $f'_{do}$ and $f'_{dl}$, respectively. Means responsive to signals $E_{D1}$ and $E_{D2}$ provides a signal $E_{D3}$ which is a function of the difference $\delta_v$ between $E_{D1}$ and $E_{D2}$. Finally, means responsive to signals $E_3$, $E_{HT}$, $E_4$, $E_{D3}$, and $E_5$, are included for providing a signal $E_{VT}$ which is representative of the vertical component of target velocity $V_{TY}$ where $Y_{TY}$ is approximately defined by the relationship:

$$V_{TY} = \frac{\lambda(R_o^2 + 4h_R h_T)^{\frac{1}{2}}}{2h_R}\delta_v$$

BRIEF DESCRIPTION OF THE DRAWINGS

FIG. 1 also illustrates the pertinent geometrical relationships involved in the operation of the subject system.

DETAILED DESCRIPTION OF THE PREFERRED EMBODIMENTS

Figure 1:
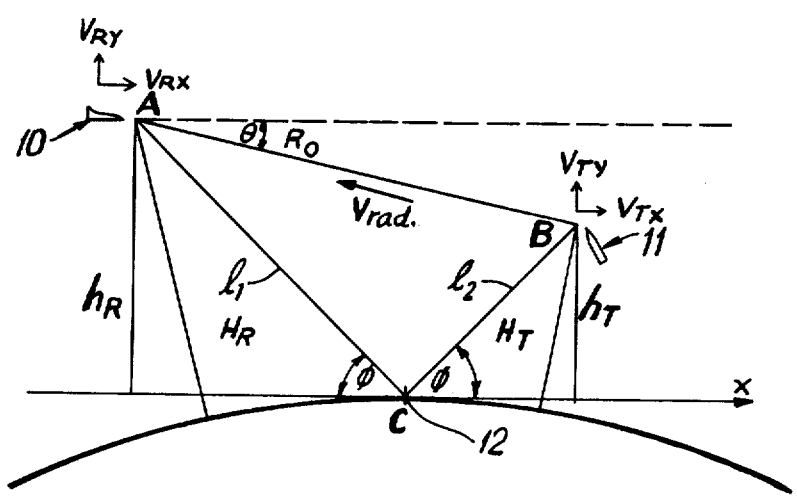
FIG. 1 is a schematic diagram illustrating the relations between an aircraft which is carrying the system of the present invention, the target, the earth and the direct path and multipath returns of electromagnetic energy from the aircraft to target and back.

Referring to FIG. 1, the system of the subject invention is adapted to be used with a radar-bearing aircraft 10 for measuring the required parameters of a target 11 which is in relative motion with respect to aircraft 10. It will be understood, however, that the subject system may also be used with a stationary radar. As shown in the figure, there are three pertinent paths along which the radar signals transmitted from aircraft 10 may traverse in going from aircraft 10 to target 11 and back. The first echo signal received by the aircraft radar is that traversing the direct return path defined by points ABA. The next echo signal received by the radar is that traversing the first multipath return which is defined by points ACBA (and ABCA). This first multipath return echo signal is really an addition of two signals received back at the radar at the same time namely, one signal traversing path ACBA and another signal traversing path ABCA. The last echo signal received by the radar is that traversing a second multipath return which is defined by points ACBCA.

In accordance with the invention, the subject system processes the radar echo signals traversing at least one of the multipaths in conjunction with that traversing the direct path to measure the desired target parameters. The subject system uses the difference in Doppler frequencies between the direct and multipath radar returns to determine the vertical speed of the target.

More particularly, it has been found that if the difference between the Doppler frequencies of the direct return and first multipath return echo signals, where there is assumed to be no contribution by the vertical velocity of the target, is filtered from the difference between the actual Doppler frequencies of the direct return and first multipath return echo signals, the remaining element comprises a third Doppler difference which is linearly proportional to the vertical target velocity and from which the actual vertical target velocity may be determined.

Before discussing the actual components of the subject system is is desirable to derive the pertinent geometrical relations between the respective Doppler differences. The first pertinent relationship is the determination of the difference between the Doppler frequencies of the direct return and the first multipath return echo signals wherein it is assumed that the target has no vertical component of velocity. Accordingly, referring to FIG. 1, the values of $V_{RY}$ and $V_{TY}$, i.e., the respective vertical components of aircraft and target velocity, must be assumed to be zero. Based upon the geometrical relations depicted in FIG. 1 the value of the frequency $f_r$ of the received first multipath echo signal is approximately defined by the relationship:

$$f_r = f_t \cdot \left[ 1 + \frac{(V_R + V_T)(\cos \phi + \cos \theta)}{C} \right] \quad (1)$$

where $V_R$ is the magnitude of the horizontal component of the radar velocity and $V_T$ is the magnitude of the horizontal component of target velocity, $f_t$ is the frequency of the transmitted signal, and C is the velocity of signal propagation.

Accordingly, from equation (1) the Doppler frequency $f_{dl}$ caused by the first multipath return is approximately defined by the relationship:

$$f_{dl} = f_t \left[ \frac{(V_R + V_T)(\cos \phi + \cos \theta)}{C} \right] \quad (2)$$

The pertinent geometric relations depicted in FIG. 1 also provide that the Doppler frequency $f_{do}$ of the direct return path is approximately defined by the relationship:

$$f_{do} = f_t \left[ \frac{2(V_R + V_T) \cos \theta}{C} \right] \quad (3)$$

Consequently, the difference in Doppler frequencies between the direct return and the first multipath return is:

$$\Delta f_d = f_{do} - f_{dl}$$

$$= f_t \frac{(V_R + V_T)(\cos \theta - \cos \phi)}{C}$$

or if $\lambda$ is the wavelength of the transmitted signal, $$\Delta f_d = \frac{(V_R + V_T)(\cos \theta - \cos \phi)}{\lambda} \quad (4)$$

Equation (4) gives the decrease in the Doppler frequency of the first multipath return compared with the direct radar return as a function of the angles $\theta$ and $\phi$. However, this is not a very convenient form for this equation. A more useful relationship is obtained by converting $\cos \theta$ and $\cos \phi$ into suitable radar parameters. Referring to FIG. 1:

$$\sin \phi = \frac{h_R}{l_1} = \frac{h_T}{l_2} \quad (5)$$

and $$\sin \theta = \frac{h_R - h_T}{R_o} \quad (6)$$

where $h_R$ and $h_T$ are the respective aircraft and target heights as measured from the line drawn tangent to the earth's surface and through reflection point C. The use of assumed aircraft and target heights $h_R$ and $h_T$ will be discussed in detail below. $R_o$ is the slant range measured by the radar system. Also from FIG. 1:

$$R_o^2 = (l_1 + l_2)^2 - 4h_R^2 \frac{l_2}{l_1} \quad (7)$$

or, $$R_o^2 = l_1^2 \left(1 + \frac{l_2}{l_1}\right)^2 - 4h_R^2 \frac{l_2}{l_1}$$

but from (5):

$$\frac{l_2}{l_1} = \frac{h_T}{h_R}$$

so that $$R_o^2 = l_1^2 \left(1 + \frac{h_T}{h_R}\right)^2 - 4h_R^2 \frac{h_T}{h_R}$$

and rearranging gives:

$$l_1 = \frac{h_R}{h_R + h_T} \sqrt{R_o^2 + 4h_R h_T}$$

Substituting the above equation into (5) results in:

$$\sin \phi = \frac{h_R + h_T}{\sqrt{R_o^2 + 4h_R h_T}} \quad (8)$$

and $$\cos \phi = \sqrt{1 - \frac{(h_R + h_T)^2}{R_o^2 + 4h_R h_T}}$$

This reduces to $$\cos\phi \sqrt{\frac{R_o^2 - (h_R - h_T)^2}{R_o^2 + 4h_R h_T}} \tag{9}$$

Next $\cos\theta$ can be found from (6):

$$\cos\theta = \sqrt{1 - \left(\frac{h_R - h_T}{R_o}\right)^2} = \sqrt{\frac{R_o^2 - (h_R - h_T)^2}{R_o^2}} \tag{10}$$

By inserting (9) and (10) into (4) the new relation for $\Delta f_d$ becomes:

$$\Delta f_d = \tag{11}$$

$$\frac{V_R + V_T}{\lambda} \sqrt{R_o^2 - (h_R - h_T)^2} \left(\frac{1}{R_o} - \frac{1}{\sqrt{R_o^2 + 4h_R h_T}}\right)$$

While the relative horizontal velocity between aircraft 10 and target 11, i.e., $V_R + V_T$, may be assumed to be constant while the aircraft and target maintain their courses, it is more suitable to use the relative radial velocity, $V_{rad}$, instead of $V_R + V_T$ because the radar system directly provides a value for $V_{rad}$ rather than $V_R + V_T$. Referring to FIG. 1:

$$(V_R + V_T) = V_{rad}/\cos\theta$$

and from (10)

$$(V_R + V_T) = V_{rad} \frac{R_o}{\sqrt{R_o^2 - (h_R - h_T)^2}}$$

The substitution of the above in (11) and letting $\Delta f_d$ become $\delta f_d$ results in $$\delta f_d = \frac{V_{rad}}{\lambda}\left(1 - \frac{R_o}{\sqrt{R_o^2 + 4h_R h_T}}\right) \tag{12}$$

where $\delta f_d$ is the difference between the Doppler frequencies of the direct return and first multipath return echo signals wherein it is assumed that the target has no vertical velocity. It will be noted that $\delta f_d$ is proportional to the relative radial velocity $V_{rad}$ between the aircraft and the target.

The next Dopper difference to be determined is $\delta f'_d$ which is the difference between the actual Doppler frequencies of the direct return and first multipath return echo signals, $f'_{do}$ and $f'_{dl}$, respectively. As will be described below, the radar system with which the subject vertical target velocity measuring system is used directly measures the values of $f'_{do}$ and $f'_{dl}$. However, it is desirable to express their values in terms of the vertical target velocity, and thus, the geometry depicted in FIG. 11 will again be used to derive the proper relationships.

In deriving the value of $\delta f_d$ as expressed in equation (12) it was assumed that the target had no vertical component of velocity. When such an assumption is not made the geometric relations in FIG. 1 provide that the actual Doppler frequencies of the indirect (first multipath) and direct return echo signals, $f'_{dl}$ and $f'_{do}$ are defined as follows:

$$f'_{dl} = \frac{(V_R - V_{Tx})(\cos\phi + \cos\theta)}{\lambda} + \frac{V_{Ty}(\sin\theta - \sin\phi)}{\lambda} \tag{13}$$

and $$f'_{do} = \frac{2(V_R - V_{Tx})\cos\theta}{\lambda} + \frac{2V_{Ty}\sin\theta}{\lambda} \tag{14}$$

where $V_T = V_{Tx}\uparrow x + V_{Ty}\uparrow y$ = target velocity.

These result in a new difference in Doppler frequency, $\Delta f'_d$, which is:

$$\Delta f'_d = f'_{do} - f'_{dl} \tag{15}$$

$$= \frac{(V_R - V_{Tx})(\cos\theta - \cos\phi)}{\lambda} + \frac{V_{Ty}(\sin\theta + \sin\phi)}{\lambda}$$

$$= \Delta f_d + \frac{V_{Ty}(\sin\theta + \sin\phi)}{\lambda}$$

Based on the above the third difference $\Delta v$ between the Doppler frequency of the direct return signal and that of the first multipath return signal which is caused by the target vertical velocity alone is defined by:

$$\Delta v = \Delta f'_d - \Delta f_d$$

$$\Delta v = \frac{V_{Ty}(\sin\theta + \sin\phi)}{\lambda}$$

Substitution for $\sin\theta$ and $\sin\phi$ using equations (6) and (8) gives:

$$\Delta v = \frac{V_{Ty}}{\lambda}\left(\frac{h_R - h_T}{R_o} + \frac{h_R + h_T}{\sqrt{R_o^2 + 4h_R h_T}}\right) \tag{16}$$

Again, because the subject radar system measures a relative radial component of velocity $V_{rad}$, it is preferable to use an equation such as (12) to predict $\delta f_d$ rather than $\Delta f_d$, which is predicted by (11). Therefore, it is desirable to have $\delta v$, the apparent shift in Doppler caused by a vertical velocity component, rather than $\Delta v$, the actual shift. Referring to FIG. 1, $\Delta f'_d$ may be defined to be $\delta f'_d$ as a function of $V_{rad}$ and $V_{Ty}$ rather than $V_R$, $V_{Tx}$, and $V_{Ty}$ as follows:

$$V_{rad} = (V_R - V_{Tx})\cos\theta + V_{Ty}\sin\theta$$

or by rearranging:

$$V_R - V_{Tx} = \frac{V_{rad} - V_{Ty}\sin\theta}{\cos\theta}$$

This relation may now be substituted for $(V_R - V_{Tx})$ in equation (15) to yield:

$$\delta f'_d = \frac{V_{rad} - V_{Ty}\sin\theta}{\cos\theta} \cdot \frac{(\cos\theta - \cos\phi)}{\lambda} + \frac{V_{Ty}(\sin\theta + \sin\phi)}{\lambda}$$

-continued $$= \frac{V_{rad}}{\lambda}\left(1 - \frac{\cos\phi}{\cos\theta}\right) + \frac{V_{Ty}}{\lambda}(\sin\phi + \cos\phi\tan\theta)$$

Using relations (6), (8), (9) and (10) as substitutions for the trigonometric functions gives:

$$\delta f_d = \frac{V_{rad}}{\lambda}\left(1 - \frac{R_o}{\sqrt{R_o^2 + 4h_Rh_T}}\right) +$$

$$\frac{V_{Ty}}{\lambda}\left(\frac{h_R + h_T}{\sqrt{R_o^2 + 4h_Rh_T}} + \right.$$

$$\left.\sqrt{\frac{R_o^2 - (h_R - h_T)^2}{R_o^2 + 4h_Rh_T}}\left(\frac{\frac{h_R - h_T}{R_o}}{\frac{\sqrt{R_o^2 - (h_R - h_T)^2}}{R_o}}\right)\right)$$

and from (12)

$$\delta f'_d = \delta f_d + \frac{V_{Ty}}{\lambda}\left(\frac{h_R + h_T}{\sqrt{R_o^2 + 4h_Rh_T}} + \frac{h_R - h_T}{\sqrt{R_o^2 + 4h_Rh_T}}\right)$$

$$= \delta f_d + \frac{V_{Ty}}{\lambda}\left(\frac{2h_R}{\sqrt{R_o^2 + 4h_Rh_T}}\right)$$

subtracting $\delta f_d$ from $\delta f'_d$ gives:

$$\delta v = \delta f'_d - \delta f_d$$

$$= \frac{V_{Ty}}{\lambda}\frac{2h_R}{\sqrt{R_o^2 + 4h_Rh_T}} \text{ and}$$

$$V_{Ty} = \frac{\delta v \lambda (R_o^2 + 4h_Rh_T)^{\frac{1}{2}}}{2h_R}$$

Based on the above, the pertinent Doppler frequency differences may be summarized as follows:

$$\delta f_d = \frac{V_{rad}}{\lambda}\left(1 - \frac{R_o}{(R_o^2 + 4h_Rh_T)^{\frac{1}{2}}}\right)$$

$$\delta f'_d = \delta f_d + \frac{V_{Ty}}{\lambda}\left(\frac{2h_R}{(R_o^2 + 4h_Rh_T)^{\frac{1}{2}}}\right)$$

$$\delta v = \delta f'_d - \delta f_d = \frac{V_{Ty}}{\lambda}\left(\frac{2h_R}{(R_o^2 + 4h_Rh_T)^{\frac{1}{2}}}\right)$$

Figure 2:
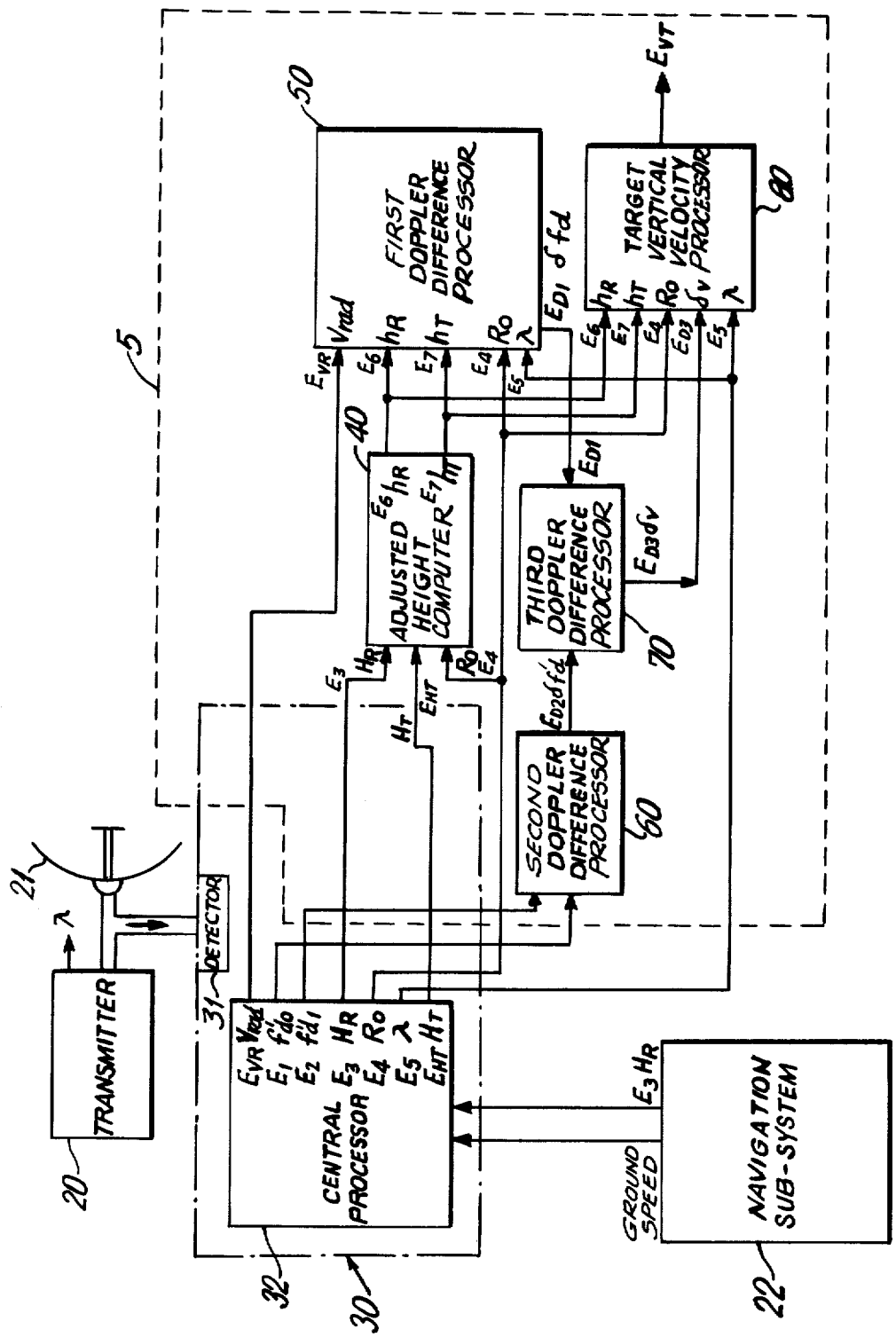
FIG. 2 is a block diagram illustrating the basic components of the subject system.
Figure 3:
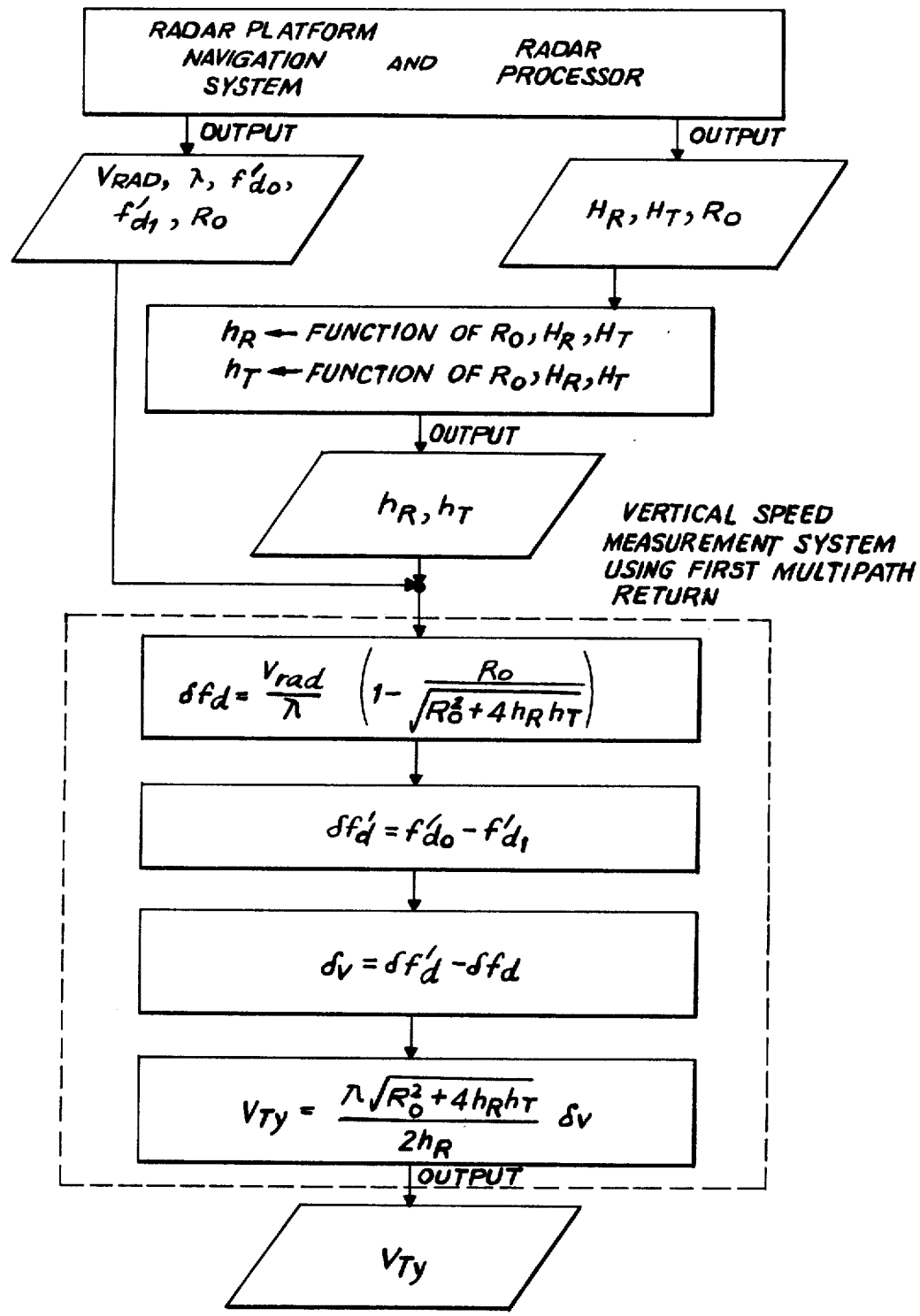
FIG. 3 is a flow chart illustrative of the operation of the subject system.

Referring now to FIGS. 2 and 3, the operation of the subject system, which is based upon the above derived relationship, will be described. As shown in the figures, the subject vertical target velocity measuring system proper, which is designated generally by reference numeral 5, is typically an addition to a Doppler radar system which may include, as depicted schematically, a transmitter 20 with an associated antenna 21, a receiver-processor 30, and a navigation subsystem 22 for measuring the parameters of the aircraft 10, e.g., ground speed, and altitude.

Turning specifically to FIG. 2, as is known in the art, antenna 21 is adapted to communicate selectively with radar transmitter 20 and receiver-processor 30 such that when coupled with transmitter 20, antenna 21 radiates electromagnetic energy of known wavelength $\lambda$ and frequency $f_t$ towards target 11, and when coupled with receiver-processor 30, antenna 21 receives the echo signals traversing the respective paths, e.g., direct, multipath. Preferably, antenna 21 is designed to provide the radar system with a large elevation beamwidth such that the radar may acquire target altitude data without scanning in elevation. It will be noted that a pair of antennae, one coupled to the transmitter, the other to the receiver-processor may be employed rather than the single antenna.

Still referring to FIG. 2, the radar receiver-processor 30 includes components which process the echo signals received from target 11 and provide at their outputs signals which are representative of certain of the target's parameters. More particularly, the radar receiver-processor 30 includes a Doppler frequency detector 31 and a central processor 32. Doppler frequency detector 31 is responsive to the transmitted signal of frequency $f_t$, as well as to the echo signals traversing the direct path and first multipath, each of the echo signals having a frequency that is different from $f_t$ as a result of the Doppler Effect. Detector 31 compares transmitted signal frequency $f_t$ with the frequency of each of the received direct return and first multipath return signals and detects the Doppler differences or frequencies as $f'_{do}$ and $f'_{d1}$, respectively. Because detector 31 measures the actual Doppler frequencies of the pertinent echo signals, each of the values of $f'_{do}$ and $f'_{d1}$ includes an element caused by the vertical component of the target velocity. Accordingly, as will be described below, the subject system may process signals representative of $f'_{do}$ and $f'_{d1}$ to ascertain the vertical velocity of the target.

Central processor 32 is responsive to detector 31 and provides at its outputs a direct Doppler signal $E_1$ which is representative of $f'_{do}$; an indirect Doppler signal $E_2$ which is representative of $f'_{d1}$; a slant range signal $E_4$ which is representative of the target slant range $R_o$; a radial velocity signal $E_{VR}$ representing the relative radial velocity $V_{rad}$ between the target and the radar; and a transmitter signal $E_5$ which is representative of the wavelength, $\lambda$, of the transmitted electro-magnetic energy.

In accordance with known methods, navigation subsystem 22 determines radar height $H_R$ and radar ground speed and transmits this information to central processor 32 which may or may not modify it for further use by the overall system. Thus, central processor 32 is also responsive to navigation sub-system 22 to provide an output signal $E_{HT}$ which is representative of the target height $H_T$.

Turning now to a more detailed description of the invention proper, the subject system 5 preferably includes an adjusted height computer 40 which is responsive to signals $E_3$, $E_4$, and $E_{HT}$ for processing said signals and providing at its outputs signals $E_6$ and $E_7$ representative of assumed radar and target heights $h_R$ and $h_T$, respectively, said assumed heights $h_R$ and $h_T$ being measured from the respective radar and target to the line tangent to the earth's surface and going through reflection point C of the earth's surface. As described in the above derivations, the values of $h_R$ and $h_T$ are employed by the subject system 5 in accordance with the invention, and so adjusted height computer 40 is provided to convert the actually measured height values $H_R$ and $H_T$ to the assumed values of $h_R$ and $h_T$. It will be noted, however, that for relatively short slant ranges $R_o$ on the order of about 100 nautical miles or less, the values of $h_R$ and $h_T$ are substantially identical to the values $H_R$ and $H_T$ actually measured by the radar such that the subject system may process signals representative of $H_R$ and $H_T$ to determine a suitable value of vertical target velocity. However, for greater slant ranges or where a more accurate measurement of vertical target velocity is required, the computation of $h_R$ and $h_T$ from $H_R$ and $H_T$ must be effected by computer 40.

Still referring to FIG. 2, the subject vertical target velocity measuring system includes a first Doppler difference processor 50 which is responsive to signals $F_4$, $E_5$, $E_6$, $E_7$ and $E_{VR}$ and provides at its output a signal $E_{D1}$ which is representative of the difference $\delta f_d$ between the direct and indirect Doppler frequencies caused by the relative radial velocity between aircraft 10 and target 11 wherein $\delta f_d$ is approximately defined by the relationship:

$$\delta f_d = \frac{V_{rad}}{\lambda}\left(1 - \frac{R_o}{(R_o^2 + 4h_R h_T)^{\frac{1}{2}}}\right)$$

As indicated above, $\delta f_d$ is determined by assuming that neither the aircraft nor the target has a vertical component of velocity and that the relative radial velocity $V_{rad}$ results from the horizontal velocities of the aircraft and target.

A second Doppler difference processor 60 is responsive to signals $E_1$ and $E_2$ for processing said signals and providing at its output a signal $E_{D2}$ which is representative of the difference $\delta f'_d$ between the direct and indirect Doppler frequencies $f'_{do}$ and $f'_{d1}$, respectively. As indicated above, the values of $f'_{do}$ and $f'_{d1}$ are the actual Doppler frequencies of the direct return and first multipath return echo signals, respectively, and as such, $f'_{do}$ and $f'_{d1}$ each include a contribution representative of the vertical component of target velocity. Accordingly, the difference $\delta f'_d$ between the direct and indirect, i.e., first multipath return, Doppler frequencies also includes a contribution of the vertical component of target velocity. It will be noted that while $\delta' f_d$ may theoretically reflect a vertical component of velocity for the radar, for most practical applications, the vertical velocity of the radar may be assumed to be insignificant such that the only vertical component of velocity reflected in $\delta' f_d$ is that of the target.

As derived above, the relationship between $\delta f'_d$ and the vertical component $V_{TY}$ of the target velocity is defined approximately by:

$$\delta f'_d = f'_{do} - f'_{d1} = \delta f_d + \frac{V_{TY}}{\lambda}\left(\frac{2h_R}{(R_o^2 + 4h_R h_T)^{\frac{1}{2}}}\right)$$

A third Doppler difference processor 70 is responsive to signals $E_{D1}$ and $E_{D2}$ and provides at its output a signal $E_{D3}$ representative of the difference $\delta v$, which is a function of the difference between $E_{D1}$ and $E_{D2}$, the difference $\delta v$ being approximately defined by $$\delta v = \delta f'_d - \delta f_d = \frac{V_{TY}}{\lambda}\left(\frac{2h_R}{(R_o^2 + 4h_R h_T)^{\frac{1}{2}}}\right)$$

A target vertical velocity processor 80 is responsive to signals $E_4$, $E_5$, $E_6$, $E_7$ and $E_{D3}$ and provides at its output a signal $E_{VT}$ which is representative of the target vertical velocity $V_{TY}$, where $V_{TY}$ is approximately defined by:

$$V_{TY} = \frac{\lambda(R_o^2 + 4h_R h_T)^{\frac{1}{2}}}{2h_R}\delta v$$

FIG. 3 is a flow chart illustrating the various processing steps performed by the subject system, the particular processing steps performed by the subject vertical speed measurement system proper being contained within the dotted-line box. As indicated, the Radar Navigation System and Radar Processor provide the Vertical Speed Measurement System with certain given values i.e. $V_{rad}$, $\lambda$, $f'_{do}$, $f'_{d1}$, $R_o$, $H_R$ and $H_T$ that are needed to ascertain vertical target velocity $V_{TY}$ using the first multipath return. In addition, in accordance with an embodiment of the invention, the given values of $R_o$, $H_R$ and $H_T$ are processed by an adjusted height computer (reference numeral 40 in FIG. 2) to provide the measuring system proper with values $h_R$ and $h_T$ which, as described above, are assumed values of radar and target height, said assumed heights being a function of actual radar and target height $H_R$ and $H_T$ and range $R_o$.

The subject measurement system proper first processes signals representative of $V_{rad}$, $\lambda$, $R_o$, $h_R$ and $h_T$ in accordance with the relationship indicated in the first box contained within the dotted lines of FIG. 3 to ascertain first Doppler difference $\delta f_d$. This processing is performed by First Doppler Difference Processor 50 in FIG. 2. The system then processes signals representative of $f'_{do}$ and $f'_{d1}$ in accordance with the relationship indicated in the second box contained within the dotted lines of FIG. 3 to obtain Second Doppler difference $\delta f'_d$. This processing is done by Second Doppler Difference Processor 60 of FIG. 2. The system then processes signals representative of $\delta f'_d$ and $\delta f_d$ in accordance with the relationship indicated in the third box contained with the dotted lines of FIG. 3 to provide a third Doppler difference $\delta v$. This processing is performed by Third Doppler Difference Processor 70 of FIG. 2. Finally, the system processes signals representative of $\lambda$, $R_o$, $h_R$, $h_T$ and $\delta v$ in accordance with the relationship indicated in the fourth box contained within the dotted lines of FIG. 3 to provide vertical target velocity $V_{TY}$. This processing is done by Target Vertical Velocity Processor 80 of FIG. 2.

Again, it will be noted that in determining $V_{TY}$ it is assumed that the radar has no vertical component of velocity itself and that the value of $V_{TY}$ is the vertical velocity of the target. Where the radar has a significant vertical velocity, however, the value of $V_{TY}$ will reflect the vertical velocity of both the target and the radar. To determine the vertical velocity of the target alone it would be necessary to first determine the vertical radar velocity by separate means and then to filter it from $V_{TY}$ to reflect the target velocity alone.

Figure 4:
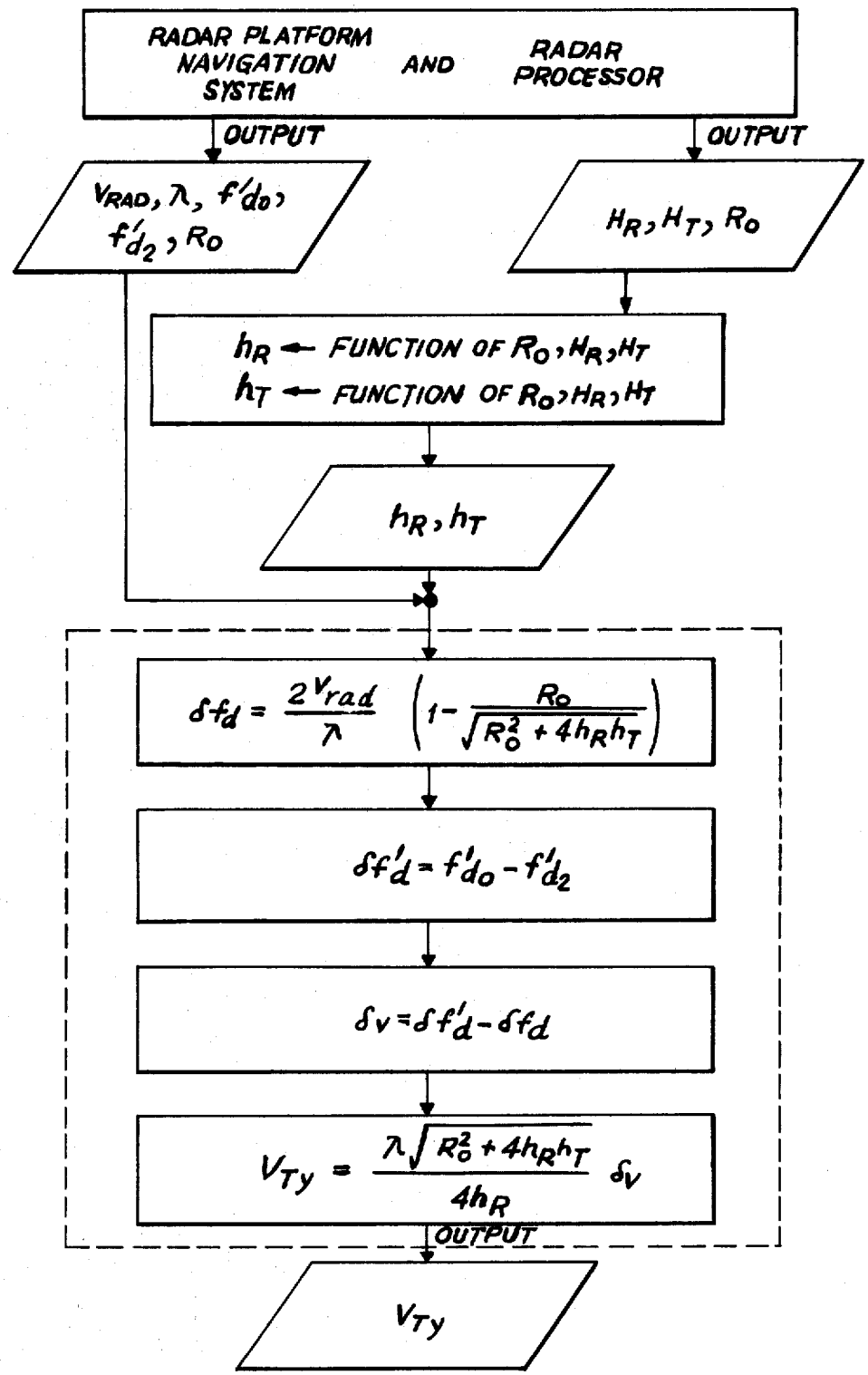
FIG. 4 is a flow chart illustrative of the operation of a second embodiment of the subject system.

Referring to FIG. 4, a flow chart for the operation of an alternate embodiment of the subject system is illustrated. In accordance with this embodiment of the invention, the second multipath return echo signal, i.e., that traversing points ACBCA rather than the first multipath return is processed with the direct return echo signal. If the embodiment of FIG. 4 is compared with that of FIG. 3 it will be noted that they are quite similar except in that the embodiment of FIG. 4 accounts for the fact that the difference $\Delta f'_{d2}$ between the Doppler frequency of the second multipath return echo signal and that of the direct return echo signal is twice the difference $f'd_1$ between the Doppler frequency of the first multipath return signal and that of the direct return echo signal. Accordingly, in FIG. 4, where $f'_{d2}$, i.e., the Doppler frequency of the second multipath return echo signal replaces $f'_{d1}$, i.e., the Doppler frequency of the first multipath return echo signal, the pertinent geometrical relations in FIG. 1 provide that:

$$\delta f_d = f'_{do} - f'_{d2}$$

$$\delta f_d = \frac{2V_{rad}}{\lambda}\left(1 - \left(\frac{R_o}{(R_o^2 + 4h_Rh_T)^{\frac{1}{2}}}\right)\right)$$

$$V_{TY} = \frac{\lambda(R_o^2 + 4h_Rh_T)^{\frac{1}{2}}}{4h_R}\delta v$$

Based upon these modified relationships it will be understood that the respective electronics contained in the respective Doppler difference processors of the system must be accordingly modified.

Referring to FIGS. 2 and 4, the Radar Navigation System and Radar Processor provide the vertical speed measurement system proper with certain given values, i.e. $V_{rad}$, $\lambda$, $f'_{do}$, $f'_{d1}$, $R_o$, $H_R$ and $H_T$ that are needed to ascertain vertical target velocity $V_{Ty}$ using the second multipath return. In addition, in accordance with an embodiment of the invention, the given values of $R_o$, $H_R$, and $H_T$ are processed by an adjusted height computer (reference numeral 40 in FIG. 2) to provide the measuring system proper with values $h_R$ and $h_T$ which, as described above, are assumed values of radar and target height, said assumed heights being a function of actual radar and target height $H_R$ and $H_T$ and range $R_o$.

The subject measurement system proper first processes signals representative of $V_{rad}$, $\lambda$, $R_o$, $h_R$ and $h_T$ in accordance with the relationship indicated in the first box contained within the dotted lines of FIG. 4 to ascertain first Doppler difference $\delta f_d$. This processing is performed by First Doppler Difference Processor 50 in FIG. 2. The system then processes signals representative of $f'_{do}$ and $f'_{d2}$ in accordance with the relationship indicated in the second box contained within the dotted lines of FIG. 4 to obtain second Doppler difference $\delta f'_d$. This processing is done by Second Doppler Difference Processor 60 of FIG. 2. The system then processes signals representative of $\delta f'_d$ and $\delta f_d$ in accordance with the relationship indicated in the third box contained within the dotted lines of FIG. 4 to provide a third Doppler difference $\delta v$. This processing is performed by Third Doppler Difference Processor 70 of FIG. 2. Finally, the system processes signals representative of $\lambda$, $R_o$, $h_R$, $h_T$ and $\delta v$ in accordance with the relationship indicated in the forth box contained within the dotted lines of FIG. 4 to provide vertical target velocity $V_{Ty}$. This processing is done by Target Vertical Velocity Processor 80 of FIG. 2.

In summary, the present invention provides an improved system for measuring the vertical velocity of a target. The system uses the significant difference in Doppler frequencies between the direct and multipath return echo signals to detect the target vertical velocity on a single dwell, i.e., without the need for the target to traverse a measurable vertical distance. Accordingly, targets having a relatively large vertical component of velocity may be more rapidly detected and classified. In addition to actual target velocity measurement the subject system may be used simply to detect types of targets. For example, where the measured vertical velocity is above a predetermined threshold it may be determined that the target is a missile rather than an aircraft and that certain special precautions must be taken.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What is claimed is:

1. A Doppler radar system for measuring the vertical component of velocity of a target in relative motion to the radar system comprising:
   A. transmitting means for radiating toward said target electromagnetic energy of known wavelength $\lambda$ and known frequency $f_t$;
   B. navigation means for determining the height of the system $H_R$ above the ground and for providing at its output a signal $E_3$ representative of $H_R$;
   C. receiver-processor means in communication with said transmitting means for receiving and processing electromagnetic energy reflected from said target, said receiver-processor means including:
      i. detector means adapted to be responsive to first and second components of the electromagnetic energy reflected from said target, said first component comprising reflected energy received from the target via a direct line of sight path between said radar system and said target and having a Doppler frequency $f'_{do}$; said second component comprising reflected energy received via an indirect path between the radar system and the target and having a Doppler frequency $f'_{d1}$ said second component including one portion traversing a path from the system to the surface of the earth to the target to the radar system, and another portion traversing a path from the radar system to the target to the surface of the earth to the radar system;
      ii. central processor means responsive to said detector means and said navigation means for;
         (1) processing said first component of reflected electromagnetic energy to provide at its output a direct Doppler signal $E_1$ representative of $f'_{do}$;

(2) processing said second component of reflected electromagnetic energy to provide at its output an indirect Doppler signal $E_2$ representative of $f'_{d1}$;

(3) determining target slant range $R_o$ and providing at its output a slant range signal $E_4$ representative of target slant range $R_o$;

(4) determining target height $H_T$ and providing at its output a signal $E_{HT}$ representative of said target height $H_T$;

(5) determining the relative radial velocity $V_{rad}$ between the system and target and providing at its output a signal $E_{VR}$ representative of radial velocity $V_{rad}$;

(6) processing the transmitted electromagnetic energy to provide at its output a transmitter signal $E_5$ representative of the wavelength $\lambda$ of the transmitted electromagnetic energy; and (7) processing said $E_3$ signal from said navigation means and providing said $E_3$ signal at its output;

D. means responsive to the signals $E_{VR}$, $E_3$, $E_4$, $E_5$, and $E_{HT}$ for providing a signal $E_{D1}$ representative of a Doppler difference $\delta f_d$, where $\delta f_d$ is approximately defined by the relationship:

$$\delta f_d = (V_{rad}/\lambda)(1 - R_o/(R_o^2 + 4 H_R H_T)^{\frac{1}{2}});$$

E. means responsive to signals $E_1$ and $E_2$ for providing a signal $E_{D2}$ representative of a difference $\delta f'_d$ between the direct and indirect Doppler frequencies $f'_{do}$ and $f'_{d1}$ respectively;

F. means responsive to signals $E_{D1}$ and $E_{D2}$ for providing a signal $E_{D3}$ which is a function of the difference $\delta v$ between $E_{D1}$ and $E_{D2}$; and G. means responsive to $E_3$, $E_{HT}$, $E_4$, $E_{D3}$, and $E_5$ for providing a signal $E_{VT}$ representative of the target vertical velocity $V_{TY}$ where $V_{TY}$ is approximately defined by the relationship:

$$V_{TY} = [R_o^2 + 4 H_R H_T]^{\frac{1}{2}}/2 H_R ]\delta v$$

2. The system of claim 1 which further includes a height adjustment computer responsive to signals $E_3$, $E_4$ and $E_{HT}$ for providing at its outputs signals $E_6$ and $E_7$ representative of the heights $h_R$ and $h_T$ of the system and target, respectively, over a line drawn tangent to the earth's surface and through the point on the earth's surface from which said indirect energy path is reflected.

3. A Doppler radar system for measuring the vertical component of velocity of a target in relative motion to the radar system comprising:

A. transmitting means for radiating toward said target electromagnetic energy of known wavelength $\lambda$ and known frequency $f_t$;

B. navigation means for determining the height of the system $H_R$ above the earth and for providing at its output a signal $E_3$ representative of $H_R$;

C. receiver-processor means in communication with said transmitting means for receiving and processing electromagnetic energy reflected from said target, said receiver-processor means including:

i. detector means adapted to be responsive to first and second components of the electromagnetic energy reflected from said target, said first component comprising reflected energy received from the target via a direct line of sight-path between said radar system and said target and having a Doppler frequency $f'_{do'}$, said second component comprising reflected energy received via an indirect path between the system and the target which includes a double reflection from the surface of the earth and having a Doppler frequency $f'_{d2}$ said second component traversing a path from the radar system to the surface of the earth to the target to the surface of the earth to the radar system;

ii. central processor means responsive to said detector means and said navigation means for;

(1) processing said first component of reflected electromagnetic energy to provide at its output a direct Doppler signal $E_1$ representative of $f'_{do}$;

(2) processing said second component of reflected electromagnetic energy to provide at its output an indirect Doppler signal $E_2$ representative of $f'_{d2}$;

(3) determining target slant range $R_o$ and providing at its output a slant range signal $E_4$ representative of target slant range $R_o$;

(4) determining target height $H_T$ and providing at its output a signal $E_{HT}$ representative of said target height $H_T$;

(5) determining the relative radial velocity $V_{rad}$ between the system and target and providing at its output a signal $E_{VR}$ representative of radial velocity $V_{rad}$;

(6) processing the transmitted electromagnetic energy to provide at its output a transmitter signal $E_5$ representative of the wavelength of the transmitted electromagnetic energy; and (7) processing said $E_3$ signal from said navigation means and providing said $E_3$ signal at its output;

D. means responsive to the signals $E_{VR}$, $E_3$, $E_4$, $E_5$, and $E_{HT}$ for providing a signal $E_{D1}$ representative of a Doppler difference $\delta f_d$, where $\delta f_d$ is approximately defined by the relationship:

$$\delta f_d = 2(V_{rad}/\lambda)(1 - R_o/(R_o^2 + 4 H_R H_T)^{\frac{1}{2}})$$

E. means responsive to signals $E_1$ and $E_2$ for providing signal $E_{D2}$ representative of a difference $\delta f'_d$ between the direct and indirect Doppler frequencies $f'_{do}$ and $f'_{d2}$ respectively;

F. means responsive to signals $E_{D1}$ and $E_{D2}$ for providing a signal $E_{D3}$ which is a function of the difference $\delta v$ between $E_{D1}$ and $E_{D2}$; and G. means responsive to $E_3$, $E_{HT}$, $E_4$, $E_{D3}$, and $E_5$ for providing a signal $E_{VT}$ representative of the target vertical velocity $V_{TY}$ where $V_{TY}$ is approximately defined by the relationship:

$$V_{TY} = \lambda](R_o^2 + 4 H_R H_T)^{\frac{1}{2}}/4 H_R]\delta v$$

4. The system of claim 3 which further includes a height adjustment computer responsive to signals $E_3$, $E_4$ and $E_{HT}$ for providing at its outputs signals $E_6$ and $E_7$ representative of the heights $h_R$ and $h_T$ of the system and target, respectively, over a line drawn tangent to the earth's surface and through the point on the earth's surface from which said indirect energy path is reflected.

5. In a Doppler radar system responsive to first and second components of electromagnetic energy reflected from a target, said first component comprising reflected energy received from the target via a direct line of sight path between the system and the target, said second component comprising reflected energy received from the target via an indirect path between the system and the target, which includes a reflection from the earth's surface, said second component including one portion traversing a path from the system to the surface of the earth to the target to the system and another portion traversing a path from the system to the target to the surface of the earth to the system, for providing at its output a signal $E_1$ representative of a Doppler frequency $f'_{do}$ of said first component of reflected energy, a signal $E_2$ representative of a Doppler frequency $f'_{d1}$ of said second component of reflected energy, a signal $E_4$ representative of target slant range $R_o$; a signal $E_{HT}$ representative of target height $E_{HT}$, a signal $E_5$ representative of the wavelength $\lambda$ of the transmitted electromagnetic energy, a signal $E_{VR}$ representative of the relative radial velocity $V_{rad}$ between the system and the target and a signal $E_3$ representative of the system height $H_R$ the combination with said system of means for measuring the vertical component of velocity of the target comprising:

A. means responsive to the signals $E_{VR}$, $E_3$, $E_4$, $E_5$, and $E_{HT}$ for providing a signal $E_{D1}$ representative of a Doppler difference $\delta f_d$, where $\delta f_d$ is approximately defined by the relationship:

$$\delta f_d = (V_{rad}/\lambda)(1 = R_o/(R_o^2 + 4\ H_R H_T)^{\frac{1}{2}});$$

B. means responsive to signals $E_1$ and $E_2$ for providing signal $E_{D2}$ representative of a difference $\delta f'_d$ between the direct and indirect Doppler frequencies $f'_{do}$ and $f'_{d1}$ respectively;
 C. means responsive to signals $E_{D1}$ and $E_{D2}$ for providing a signal $E_{D3}$ which is a function of the difference $\delta v$ between $E_{D1}$ and $E_{D2}$; and
 D. means responsive to $E_3$, $E_{HT}$, $E_4$, $E_{D3}$, and $E_5$ for providing a signal $E_{VT}$ representative of the target vertical velocity $V_{TY}$ where $V_{TY}$ is approximately defined by the relationship:

$$V_{TY} = \lambda[(R_o^2 + 4\ H_R H_T)^{\frac{1}{2}}/2H_R]\delta v.$$

6. The system of claim 5 which further includes a height adjustment processor responsive to signals $E_3$, $E_4$ and $E_{HT}$ for providing at its outputs signals $E_6$ and $E_7$ representative of the heights of the system and target respectively over a line drawn tangent to the earth's surface and through the point on the earth's surface from which said indirect energy path is reflected.

7. In a Doppler radar system responsive and second components of electromagnetic energy reflected from a target, said first component comprising reflected energy received from the target via a direct line of sight path between the system and the target, said second component comprising reflected energy received from the target via an indirect path between the system and the target which includes a double reflection from the earth's surface, said second component traversing a path from the system to the surface of the earth to the target to the surface of the earth to the system, for providing at its output a signal $E_1$ representative of a Doppler frequency $f'_{do}$ of said first component of reflected energy, a signal $E_2$ representative of a Doppler frequency $f'_{d2}$ of said second component of reflected energy, a signal $E_4$ representative of target slant range $R_o$, a signal $E_{HT}$ representative of target height $E_{HT}$, a signal $E_5$ representative of the wavelength $\lambda$ of the transmitted electromagnetic energy, a signal $E_{VR}$ representative of the relative radial velocity $V_{rad}$ between the system and the target and a signal $E_3$ representative of the system height $H_R$ the combination with said system of means for measuring the vertical component of velocity of the target comprising:

A. means responsive to the signals $E_{VR}$, $E_3$, $E_4$, $E_5$, and $E_{HT}$ for providing a signal $E_{D1}$ representative of a Doppler difference $\delta f_d$, where $\delta f_d$ is approximately defined by the relationship:

$$\delta f_d = (2V_{rad}/\lambda)(1 - R_o/(R_o^2 + 4H_R H_T)^{\frac{1}{2}});$$

B. means responsive to signals $E_1$ and $E_2$ for providing a signal $E_{D2}$ representative of a difference $\delta f'_d$ between the direct and indirect Doppler frequencies $f'_{do}$ and $f'_{d1}$ respectively;
 C. means responsive to signals $E_{D1}$ and $E_{D2}$ for providing a signal $E_{D3}$ which is a function of the different $\delta v$ between $E_{D1}$ and $E_{D2}$; and
 D. means responsive to $E_3$, $E_{HT}$, $E_4$, $E_{D3}$, and $E_5$ for providing a signal $E_{VT}$ representative of the target vertical velocity $V_{TY}$ where $V_{TY}$ is approximately defined by the relationship:

$$V_{TY} = \lambda[(R_o^2 + 4H_R H_T)^{\frac{1}{2}}/4H_R]\delta v.$$

8. The system of claim 7 which further includes a height adjustment processor responsive to signals $E_3$, $E_4$ and $E_{HT}$ for providing at its outputs signals $E_6$ and $E_7$ representative of the heights of the system and target respectively over a line drawn tangent to the earth's surface and through the point on the earth's surface from which said indirect energy path is reflected.

9. A method for measuring the vertical component of velocity of a target in relative motion with respect to a reference point comprising the steps of:

A. radiating toward said target electromagnetic energy of known wavelength $\lambda$ and known frequency $f_t$;
 B. determining the relative radical velocity $V_{rad}$ between the reference point and the target and the height of the reference point $H_R$ above the earth and providing a signal $E_{VR}$ representative of $V_{rad}$ and a signal $E_3$ representative of $H_R$;
 C. detecting first and second components of the electromagnetic energy reflected from said target, said first component comprising reflected energy received from the target via a direct line of sight path between said reference point and said target and having a Doppler frequency $f'_{do}$, said second component comprising reflected energy received via an indirect path between said reference point and said target which includes a reflection from the surface of the earth and having a Doppler frequency $f_{d1}$, said second component including one portion traversing a path from the reference point to the surface of the earth to the target to the reference point and another portion traversing a path from the reference point to the target to the surface of the earth to the reference point;
 D. processing said first component of reflected electromagnetic energy to provide a direct Doppler signal $E_1$ representative of $f'_{do}$;
 E. processing said second component of reflected electromagnetic energy to provide an indirect Doppler signal $E_2$ representative of $f'_{d1}$;

F. determining target slant range $R_o$ and providing a slant range signal $E_4$ representative of target slant $R_o$;

G. determining target height $H_T$ and providing a signal $E_{HT}$ representative of said target height $E_{HT}$;

H. processing the transmitted electromagnetic energy to provide a transmitter signal $E_5$ representative of the wavelength $\lambda$ of the transmitting electromagnetic energy;

I. processing the signals $E_{VR}$, $E_3$, $E_4$, $E_5$, and $E_{HT}$ to provide a signal $E_{D1}$ representative of a Doppler difference $\delta f_d$, where $\delta f_d$ is approximately defined by the relationship:

$$\delta f_d = (V_{rad}/\lambda)(1 - R_o/(R_o^2 + 4H_R H_T)^{\frac{1}{2}});$$

J. processing signals $E_1$ and $E_2$ to provide a signal $E_{D2}$ representative of a difference $\delta f'_d$ between the direct and indirect Doppler frequencies $f'_{do}$ and $f'_{d1}$ respectively.

K. processing signals $E_{D1}$ and $E_{D2}$ to provide a signal $E_{D3}$ which is a function of the difference $\delta v$ between $E_{D1}$ and $E_{D2}$; and L. processing signals $E_3$, $E_{HT}$, $E_4$, $E_{D3}$, and $E_5$ to provide a signal $E_{VT}$ representative of the target vertical velocity $V_{TY}$ where $V_{TY}$ is approximately defined by the relationship:

$$V_{TY} = \lambda[(R_o^2 + 4H_R H_T)^{\frac{1}{2}}/2H_R]\delta v.$$

10. The method of claim 9 which further includes the step of processing signals $E_3$, $E_4$ and $E_{HT}$ to provide signals $E_6$ and $E_7$ representative of the heights $h_R$ and $h_T$ of the system and target, respectively, over a line drawn tangent to the earth's surface and through the point on the earth's surface from which said indirect energy path is reflected.

11. A method for measuring the vertical component of velocity of a target in relative motion with respect to a reference point comprising the steps of:

A. radiating toward said target electromagnetic energy of known wavelength $\lambda$ and known frequency $f_t$;

B. determining the relative radial velocity $V_{rad}$ between the reference point and the target and the height of the reference point $H_R$ above the earth and providing a signal $E_{VR}$ representative of $V_{rad}$ and a signal $E_3$ representative of $H_R$;

C. detecting first and second components of the electromagnetic energy reflected from said target, said first component comprising reflected energy received from the target via a direct line of sight path between said reference point and said target and having a Doppler frequency $f'_{do}$, said second component comprising reflected energy received via an indirect path between the reference point and the target which includes a double reflection from the surface of the earth and having a Doppler frequency $f'_{d2}$, said second component traversing a path from the system to the surface of the earth to the target to the surface of the earth to the system;

D. processing said first component of reflected electromagnetic energy to provide a direct Doppler signal $E_1$ representative of $f'_{do}$;

E. processing said second component of reflected electromagnetic energy to provide an indirect Doppler signal $E_2$ representative of $f'_{d2}$;

F. determining target slant range $R_o$ and providing a slant range signal $E_4$ representative of target slant range $R_o$;

G. determining target height $H_T$ and providing a signal $E_{HT}$ representative of said target height $H_T$;

H. processing the transmitted electromagnetic energy to provide a transmitter signal $E_5$ representative of the wavelength $\lambda$ of the transmitted electromagnetic energy;

I. processing the signals $E_{VR}$, $E_3$, $E_4$, $E_5$, and $E_{HT}$ to provide a signal $E_{D1}$ representative of a Doppler difference $\delta f_d$, where $\delta f_d$ is approximately defined by the relationship:

$$\delta f_d = (2V_{rad}/\lambda)(1 - R_o/(R_o^2 + 4H_R H_T)^{\frac{1}{2}});$$

J. processing signals $E_1$ and $E_2$ to provide a signal $E_{D2}$ representative of a difference $\delta f'_d$ between the direct and indirect Doppler frequencies $f'_{do}$ and $f'_{d2}$ respectively;

K. processing signals $E_{D1}$ and $E_{D2}$ to provide a signal $E_{D3}$ which is a function of the difference $\delta v$ between $E_{D1}$ and $E_{D2}$; and L. processing signals $E_3$, $E_{HT}$, $E_4$, $E_{D3}$, and $E_5$ to provide a signal $E_{VT}$ representative of the target vertical velocity $V_{TY}$ where $V_{TY}$ is approximately defined by the relationship:

$$V_{TY} = \lambda[R_o^2 + 4H_R H_T)^{\frac{1}{2}}/4H_R]\delta v.$$

12. The method of claim 11 which further includes the step of processing signals $E_3$, $E_4$ and $E_{HT}$ to provide signals $E_6$ and $E_7$ representative of the heights $h_R$ and $h_T$ of the system and target, respectively, over a line drawn tangent to the earth's surface and through the point on the earth's surface from which said indirect energy path is reflected.

* * * * *